US005665445A

United States Patent [19]

Carney, Jr.

[11] Patent Number: 5,665,445

[45] Date of Patent: Sep. 9, 1997

[54] DATA STORAGE OBJECT LABEL WITH REMOVAL AREA

[76] Inventor: Robert S. Carney, Jr., 4232 Colfax Ave. South, Minneapolis, Minn. 55409

[21] Appl. No.: 461,875

[22] Filed: Jun. 5, 1995

[51] Int. Cl.[6] .................................................... B32B 3/00

[52] U.S. Cl. .......................... 428/40.1; 40/299; 206/232; 206/459.5; 283/81; 428/41.7; 428/41.8; 428/43; 428/195; 428/201; 428/202

[58] Field of Search ................................ 428/40, 41, 42, 428/43, 195, 202, 201, 40.1, 40.5, 41.7, 41.8, 41.9; 40/299; 283/81; 206/232, 459.5

[56] References Cited

U.S. PATENT DOCUMENTS

| | | | |
|---|---|---|---|
| 2,264,629 | 12/1941 | Engert et al. | 40/2 |
| 2,721,810 | 10/1955 | Schram | 117/45 |
| 4,302,277 | 11/1981 | Ilsemann | 156/567 |
| 4,587,152 | 5/1986 | Gleichenhagen et al. | 428/195 |
| 4,661,189 | 4/1987 | Voy et al. | 428/40 |
| 4,735,837 | 4/1988 | Miyasaka et al. | 428/40 |
| 4,771,891 | 9/1988 | Sorensen et al. | 428/40 |
| 4,889,234 | 12/1989 | Sorensen et al. | 428/40 |
| 5,436,059 | 7/1995 | Kano | 428/195 |
| 5,487,929 | 1/1996 | Rusincovitch | 428/202 |

OTHER PUBLICATIONS

Advertisement for label removal kit, Lyben Computer Systems, 1995.

Advertisement for LABEL–IT, Lyben Computer Systems, 1995.

*Primary Examiner*—Nasser Ahmad

*Attorney, Agent, or Firm*—Dorsey & Whitney LLP

[57] ABSTRACT

A label for labeling a data storage object, comprising a first layer and a second layer. The first layer has a first side and a second side. The first side of the first layer forms the front side of the label and provides a surface for receiving indicia such as a written description of the contents of the data storage object. The second side of the first layer is substantially and completely covered with a removable bond adhesive. The second layer is a patterned application of a material, which can be an ink or varnish, or a continuous sheetlike layer of material, or another substance which forms a layer when applied to the second side of the first layer. The pattern of the second layer can be a geometrical pattern or a random pattern, or a combination of geometric and random patterns. When the second layer is applied or attached to the first layer, the second layer defines both areas of exposed adhesive, where the second side of the first layer is an outer surface of the label, and areas where the second layer is an outer surface of the label. At least one area of the adhesive side of the label has a removal area. The removal area allows the user to conveniently remove the label.

7 Claims, 10 Drawing Sheets

Example of use on a data storage object

Computer diskette

Example of use on a data storage object

Videotape

Side view

Rear view

Rear view

Rear view

Rear view

Front view

Rear view

Rear view

DATA STORAGE OBJECT LABEL WITH REMOVAL AREA

TECHNICAL FIELD

The present invention relates to labels generally, and in particular to labels for data storage objects such as computer diskettes and videotapes.

BACKGROUND OF THE INVENTION

Data storage objects such as diskettes and videotapes require labels with information about the content of the data storage object. While data storage objects can be reused, labels generally are not reused. Removal of a label from a data storage object can be difficult. Scrapers, knives and other tools may be used to try to remove a label. One product used to remove labels is a commercially available kit, with a solution applied to dissolve the glue. Another commercially available product known as LABEL IT, contains a label holder designed to be attached to a computer diskette, and to hold cards with information about the diskette.

Because data in data storage objects can be repeatedly updated or added to, the label information must be updated. Because the useful life of the data storage object typically exceeds the available writing surface of one label, it is desirable to be able to easily remove and replace labels. As the ease of relabeling increases, the value of data storage objects is increased, because reuse of the data storage object is promoted.

Customarily, labels for data storage objects are fully coated with an adhesive material. Furthermore, the adhesive materials are normally classified as permanent-type adhesives or removable adhesives. When a label is fully coated with a permanent-type adhesive, and is applied to a product, it normally cannot be removed without damaging either the label or the product upon which it is mounted. On the other hand, a label having a removable adhesive material can often be removed and reapplied.

U.S. Pat. No. 4,735,837 pertains to a removable adhesive sheet comprising an adhesive composition with what are called elastic micro-balls. U.S. Pat. No. 4,587,152 pertains to a redetachable sheetlike structure with callotte-shaped bonding sites up to 600 microns in diameter. Commercially available label material with removable properties, such as the properties described in the above two patents, have resulted in labels that are easier to remove from data storage objects than earlier labels, which often had a continuous coating of a permanent adhesive.

These type of labels and current computer disketee labels characterized as removable labels have several problems. First, because the diskette houses a sensitive magnetic surface, it is preferable to avoid or minimize bending the diskette. However, to provide for permanent labeling, the adhesive used for labels is typically strong enough to result in bending the diskette when the label is removed, and/or to require the user to peel slowly to minimize bending. Second, materials used to minimize tearing of the label tend not to readily receive writing from some kinds of pencils or pens. Third, because the adhesive coating is continuous, it is often necessary to pick at an edge to get the removal of the label started. This can also result in bending the diskette, or compressing the diskette into the inside magnetic surface. Fourth, as a label ages the adhesive strength of the bond usually changes. For labels with continuous coatings of adhesive, increases in bond strength over time can make label removal significantly more difficult. When adhesive material is such that bond strength decreases, labels can, over time, spontaneously separate from data storage objects.

Another problem with current labels for data storage objects is the lack of an easy identification method to record the date of first use of each specific data storage object. Generally, over time, the strength of the magnetic field of the material used to store the data can deteriorate, even if the data storage object is stored securely. To maintain a high level of certainty regarding the reliability of data stored in a data storage object, it is desirable to permanently preserve on a data storage object the date when the object went into service. Clearly, there is a need for a label which allows the user to permanently record on the label the date the object first went into use.

Because uses of data storage objects vary, and the desirable attributes of a label vary accordingly, it is very difficult for a single label design to optimize all label attributes most important for every type of use of data storage objects. When it is known the object will be relabeled within a short time, or after handling the object only a few times, convenience of removablilty becomes more important, and durability of the label becomes less important. By contrast, when it is known the object will be handled many times, or that the label will remain on for a long period of time, durability of the label is the first priority.

Although the ideal requirements of a label vary according to the use of the label, the approach taken by manufacturers of data storage objects and labels has been the production of what could be called all-purpose labels. This is understandable due to issues of economy and simplicity. However, the resulting labels appear to represent a compromise between removability and permanence. If specialty labels which are designed for use with data storage objects are available, the use of data storage objects may be increased and extended when the user can select specific labels for specific purposes. As an example, people may use diskettes more frequently to exchange data when they can use a specialty label to label the diskette once, and when the recipient can then easily remove the label and put the disk to further use.

SUMMARY OF THE INVENTION

A label for labeling a data storage object, comprising a first layer and a second layer. The first layer has a first side and a second side. The first side of the first layer forms the front side of the label and provides a surface for receiving indicia such as a written description of the contents of the data storage object. The second side of the first layer is substantially and completely covered with a removable bond adhesive.

The second layer is a patterned application of a material, which can be an ink or varnish, or a continuous sheetlike layer of material, or another substance which forms a layer when applied to the second side of the first layer. The pattern of the second layer can be a geometrical pattern or a random pattern, or a combination of geometric and random patterns. When the second layer is applied or attached to the first layer, the second layer defines both areas of exposed adhesive, where the second side of the first layer is an outer surface of the label, and areas where the second layer is an outer surface of the label.

Areas of the back side of the label of the present invention can be described in terms of a percentage of exposed adhesive. The percentage of exposed adhesive for any area of the back side of the label of the present invention is defined as the percentage of the area where the adhesive on the second side of the first layer is an exposed outer surface of the label.

At least one area of the adhesive side of the label is a removal area. A removal area is defined as having two properties. First, the periphery of a removal area is a combination of outer edges of the label, together with a single inner line connecting two points on outer edges of the label, such that at some point on the inner line a second line perpendicular to the inner line and at least ⅛ inch in length can be drawn within the removal area connecting the inner line to some point on the outer edge of the label. Second, a removal area has a percentage of exposed adhesive that is ½ or less than the percentage of exposed adhesive as calculated for the entire area of the label. Any area of the label with the two properties described above is a removal area. FIG. 4 illustrates a removal area 57.

Data storage objects often have an industry standard design, including areas of the surface of the object that are intended for labeling or suitable for labeling. Such an area on a data storage object will be referred to as a label placement area. When a label of the present invention is manufactured for use on a specific type of data storage object, the specific label design includes at least one removal area located to maximize both easy and accurate placement on a label placement area, and ease of removal from a label placement area.

The composition of materials used for the label of the present invention is chosen to provide for attributes including a surface that can be easily written or printed onto with a wide variety of printers, pens, pencils and inks, and a stiffness such that the label tends to retain a smooth plane surface while on a data storage object, and when removed and attached multiple times. Although the label of the present invention uses a removal area to facilitate removal, the advantages of a removal area could be at least partially duplicated by using a stiffer label material.

Prior to using the label, the adhesive outer surface is in contact with a release layer. When using the label, the release layer is removed and the label is attached to a data storage object.

One object of the present invention is to provide a label which can be first, entirely applied to a data storage object, then second, easily and entirely removed from the object while the label retains a smooth plane surface, then third, entirely reapplied to the same data storage object or to a different data storage object.

Another object of the present invention is to provide a label that will continue to adhere to a data storage object over a long period of time, and over many handlings, insertions and removals, when the object is handled with care, not exposed to unusual heat or cold, and stored in a suitable container when not in use.

DETAILED DESCRIPTION OF THE PREFERRED EMBODIMENT

Figure 1:
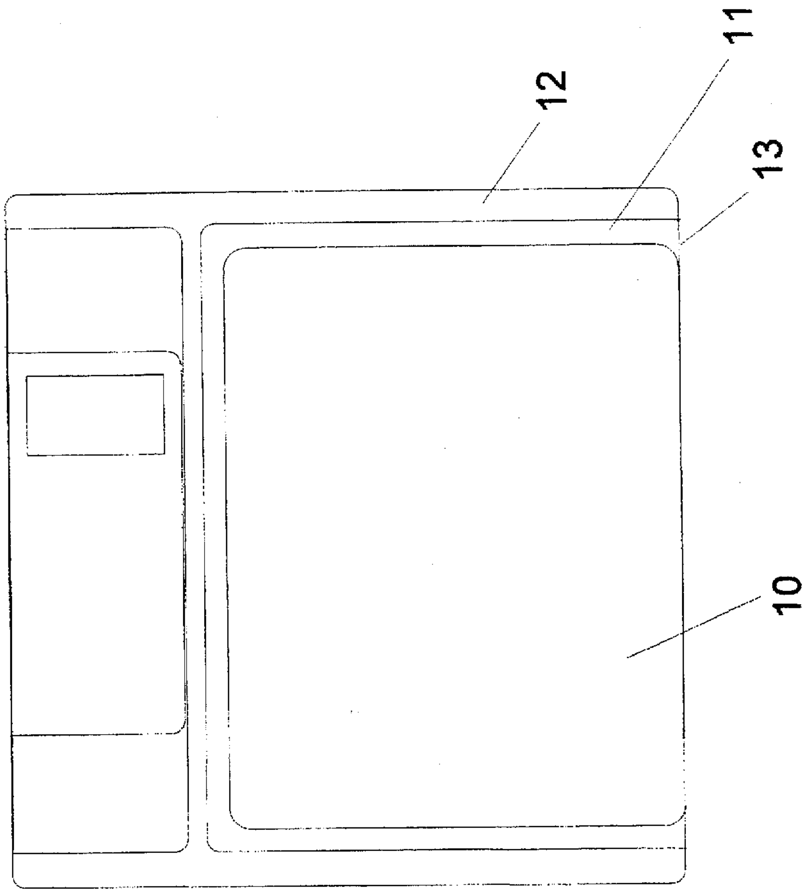
FIG. 1 shows the label of the present invention attached to a computer diskette.
Figure 2:
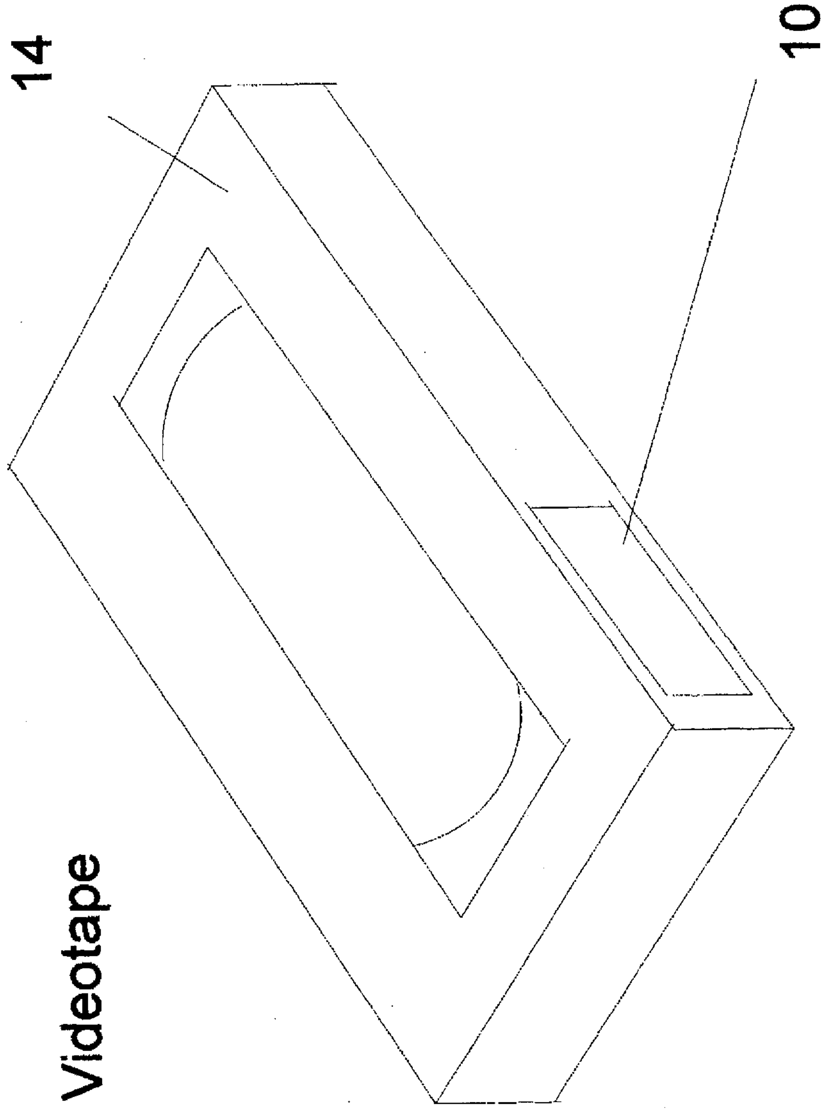
FIG. 2 shows the label of the present invention attached to a video tape.

FIGS. 1 and 2 show a label 10 of the present invention attached to a computer diskette 12 and a video tape 14. The label 10 receives indicia describing the contents of data storage objects such as the computer diskette 12 and video tape 14. As shown in FIG. 1, the label 10 is placed on a label placement area 11 of a computer diskette, such that one edge of the label 10 is aligned with a surface edge 13 of the label placement area 11.

Figure 3:
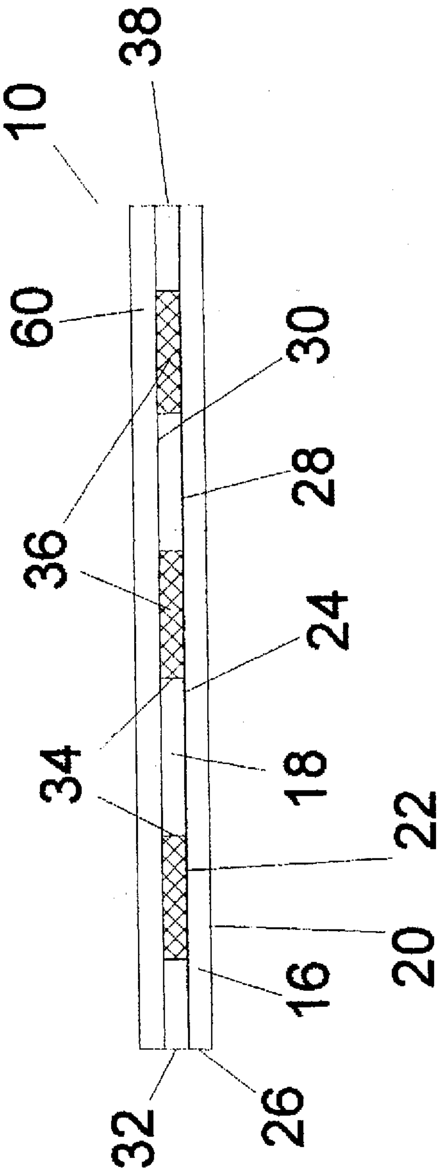
FIG. 3 shows a side view of the label of the present invention.

FIG. 3 shows a side view of the label 10. The label 10 comprises a first layer 16 and a second layer 18. The first layer 16 has a first side 20, a second side 22, and a peripheral edge 26. The first side 20 forms the front side of the label 10. It is this front side of the label 10 which receives the indicia regarding the contents of the object to be labeled. The second side 22 of the first layer 16 is substantially and completely covered with a layer of removable bond adhesive 24. The first layer 16 can be produced from commercially available rolls of label paper having one side substantially and completely covered with a layer of removable bond adhesive.

The second layer 18 is composed of ink or varnish, which is printed as a patterned application onto the second side 22 of the first layer 16. The second layer 18 forms the backside of the label 10 into areas where the second layer 18 is an outer surface of the label, and areas where the second side 22 of the first layer is an outer surface of the label. Over time, some adhesive on the second side 22 of the first layer permeates the second layer, resulting in a weak adhesive bond with a labeled object. However, for areas where the second layer 18 is an outer surface, the adhesive strength of the outer surface of the label is weaker than the adhesive strength of the label for areas where the second side 22 of the first layer is an outer surface of the label.

Although the present invention uses ink or varnish for the second layer, any substance that allows for permeation of the glue can be used. Also, if stiffer paper is used to form the first layer 16, then less permeability is required in the second layer. This relationship occurs because stiffer paper will retain its form and remain adjacent to the surface of the data storage object. Thus, stiffer paper doesn't need glue to permeate through the second layer 18 to remain flat on the label placement area 11.

Referring to FIG. 3, prior to using the label 10, the second layer 18 is between the first layer 16 and a release layer 60. This release layer 60 is removed before attaching the label 10 to an object.

Figure 4:
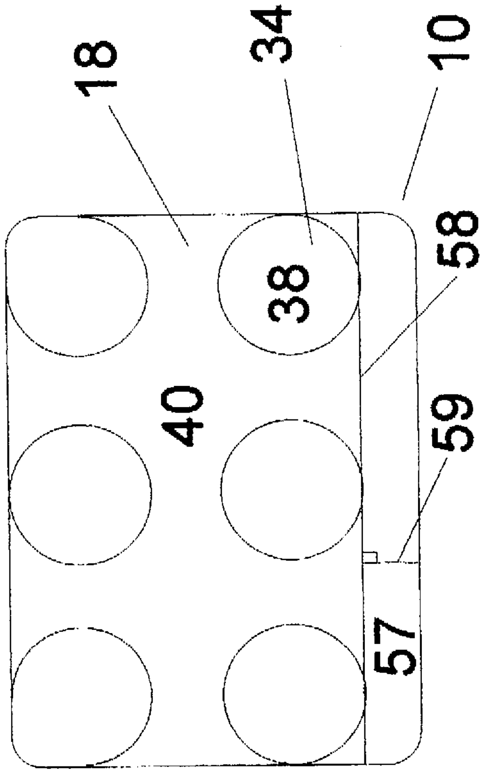
FIG. 4 shows a rear view of the label of the present invention, and illustrates a removal area.
Figure 5:
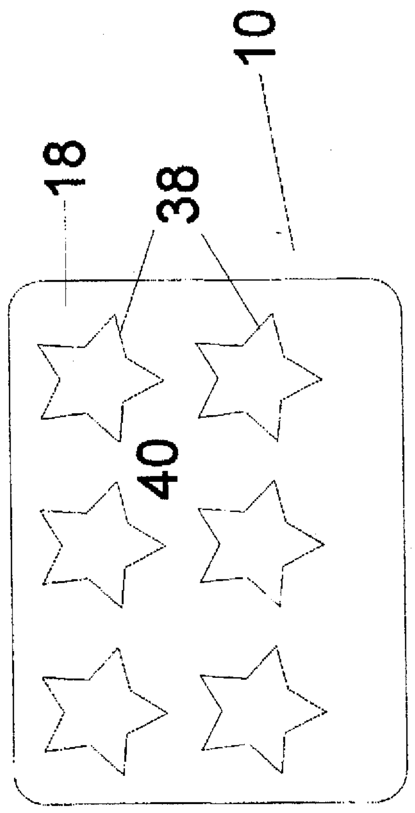
FIG. 5 shows a rear view of the label of the present invention having a star pattern.
Figure 6:
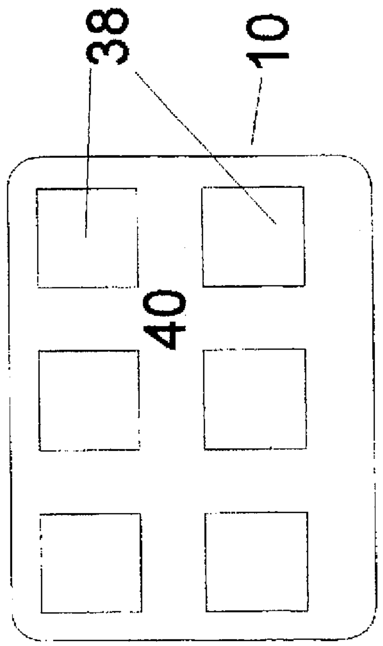
FIG. 6 shows a rear view of the label of the present invention having a square pattern.
Figure 7:
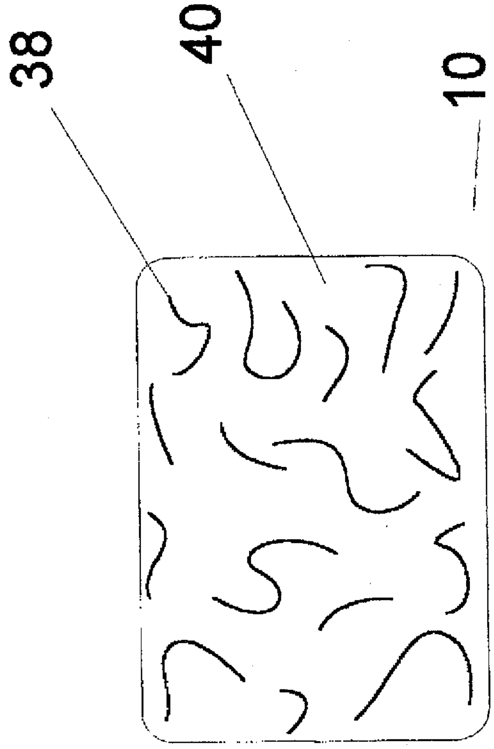
FIG. 7 shows a rear view of a label of the present invention having a random pattern.

FIG. 4 shows a rear view of a label 10. In the label 10 shown in FIG. 4 there are six areas 38 where the second side 22 of the first layer 16 is an outer surface of the label. Although FIG. 4 shows these areas 38 to be circular except when the area of exposed adhesive is extended to a corner of the label, as shown in FIGS. 5, 6, and 7 these areas may be of any pattern including a star pattern, a square pattern, or a random pattern, or these areas may be a combination of patterns.

Continuing to refer to FIG. 4, the area 57 is a removal area. The inner line 58 together with outer edges of the label are the periphery of the removal area. A second line 59, is within the removal area 57, is perpendicular to the inner line 58, is of length ⅛ inch or greater, and connects the inner line 58 to a point on the outer edge of the label. Although the removal area 57 shown in FIG. 4 has a continuous application of the second layer 18, and therefore a percentage of exposed adhesive of 0%, the removal area could have any pattern of the second layer 18, such that the percentage of exposed adhesive for the removal area is ½ or less than percentage of exposed adhesive for the entire label.

In operation, the release layer 60 is removed from the label 10, and the label 10 is attached to a data storage object such as a computer diskette 12 or a video tape 14. When the data storage object has a label placement area such that one edge of the label placement area is a surface edge, such as the edge 13 shown in FIG. 1, the label is placed on the data storage object such that a removal area of the label 10 is next to a surface edge of the label placement area, and the label edge is aligned with the surface edge of the label placement area. By the action of pulling a finger along the removal area edge, the label edge is easily drawn away from the data storage object, and the label can then be easily removed.

Figure 8:
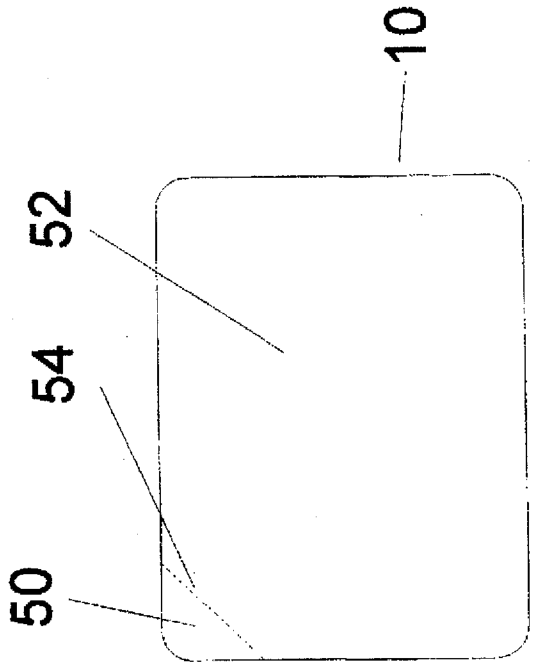
FIG. 8 shows a front view of the label of the present invention having a first section and a second section.
Figure 9:
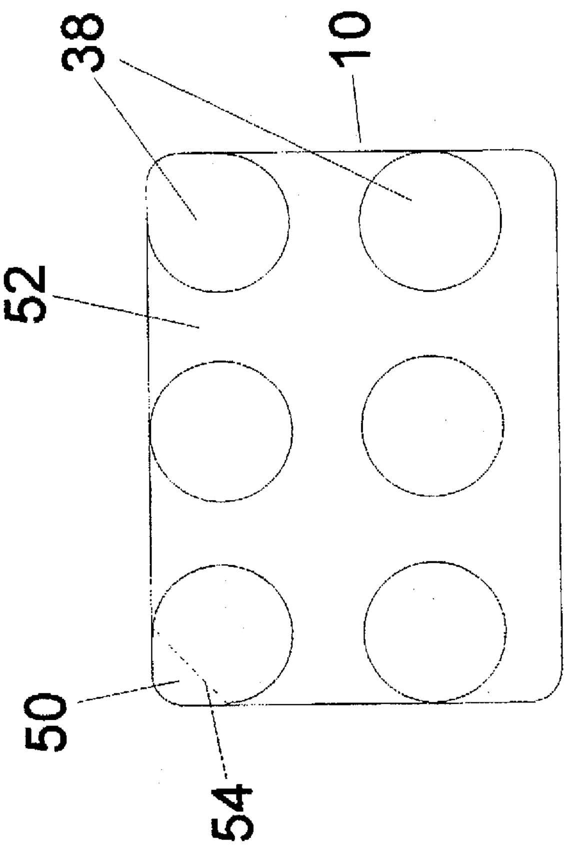
FIG. 9 shows a rear view of the label of the present invention having a first section and a second section.
Figure 10:
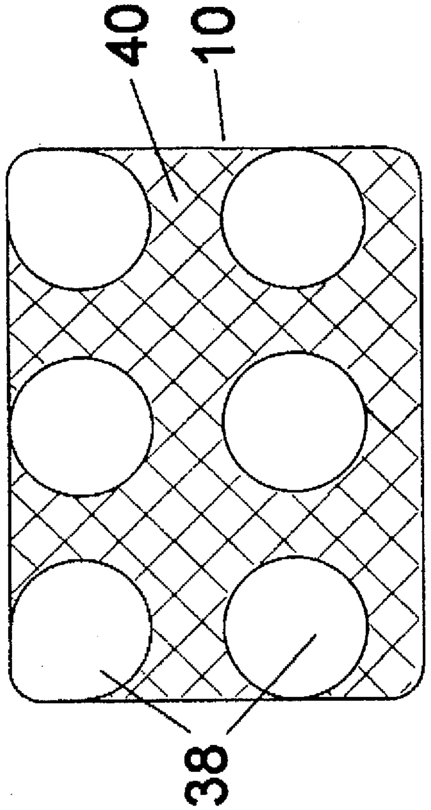
FIG. 10 shows the label of the present invention having different colors to differentiate areas having exposed adhesive.

As shown in FIGS. 8, 9, and 10, another feature of the present invention is that the label may be divided into one or more smaller first label sections 50 and one or more larger second label sections 52. Label sections are defined by a line of weakness. Continuing to refer to FIG. 8, this line of weakness is a perforation 54 across the label 10. Because of this perforation 54, one label section 50, 52 may be removed from the data storage object. In the preferred embodiment, one first label section 50 remains attached to the data storage object when label section 52 is removed from the data storage object. This feature allows the user to permanently affix the date the data storage object was first used on the first label section 50. Thus, in use, the user leaves label section 50 on the data storage object, but removes label section 52 by separating the sections at the line of weakness 54. The sections 52 and 50 of a new label are separated, and the user places section 52 of the new label on the data storage object. This feature allows the user to maintain a high level of certainty of reliability of data stored in the data storage object by monitoring information such as the length of time the particular data storage object has been in use. While the preferred embodiment uses only one adhesive material for the second side 24 of the first layer 16, a stronger, permanent bond adhesive may be applied to the second side 24 of the first layer 16 only on areas of first label sections 50. When the label of the present invention is divided into sections by a line or lines of weakness, the definition of a removal area is to be used to identify removal areas for the label for each possible combination of contiguous sections of the label. All claims refer both to the label of the present invention before the separation of any sections, and also refer to all possible combinations of contiguous sections of the label of the present invention after separation of sections along a line or lines of weakness.

As shown in FIG. 9, the backside of the label 10 which forms the backside of the first label section 50 must include an adhesive area 38, so that when the second label section 52 is detached from the first label section 50, the first label section 50 can remain attached to the data storage object.

FIG. 10 shows the label 10 having adhesive areas 38 not colored thereby differentiating adhesive areas 38 from colored areas of ink, varnish or other material. This feature makes the present invention more visibly different from other labels, and promotes the user's awareness that it is now more practical to reuse data storage objects. In the preferred embodiment the second layer 18 is made of colored ink or varnish, and is printed onto the first layer 16.

While preferred embodiments of the present invention have been described, it should be appreciated that various modifications may be made by those skilled in the art without departing from the spirit and scope of the present invention. Accordingly, reference should be made to the claims to determine the scope of the present invention.

What is claimed is:

1. A data storage object label for labeling to a data storage object, comprising:

(a) a first layer having a first side and a second side;

(b) said first side of said first layer forming a front side of said data storage object label and providing a surface for receiving indicia;

(c) said second side of said first layer being covered by a continuous coating of removable adhesive;

(d) a second layer, of a non-adhesive material selected from the group consisting essentially of ink or varnish, applied over the continuous adhesive coating that is on the second side of the first layer, and said second layer forming the back side of said label into one or more area(s) where the adhesive coating that is on the second side of the first layer is exposed; and (e) at least one removal area formed on the back side of said data storage object label, wherein the at least one removal area has a percentage of exposed adhesive of about zero percent (0%) to between fifty percent and (50%) of the percentage of exposed adhesive for the entire area of the label, thereby facilitating removal of said data storage object label.

2. The label of claim 1, further comprising one or more first label section(s) and one second label section, wherein the second label section may be detached from the first label section(2) along a line of weakness, while the first label section remains attached to a data storage object.

3. The label of claim 2, wherein said at least one first label section may be removed from said data storage object.

4. The label of claim 2, wherein at least one said first label section may be removed from said data storage object while said second label section remains on the data storage object.

5. The label of claim 2, wherein at least one first section may be first separated from said second section of the label, and may then be applied to a data storage object.

6. The label of claim 1, wherein areas of exposed adhesive of the second side of the first layer form a polka dot pattern.

7. The label of claim 1, wherein, prior to using the label, said second layer is between said first layer and a release layer.

* * * * *